US008386515B2

(12) United States Patent
Bent et al.

(10) Patent No.: US 8,386,515 B2
(45) Date of Patent: Feb. 26, 2013

(54) PERSISTENT QUERYING IN A FEDERATED DATABASE SYSTEM

(75) Inventors: Graham Bent, Southampton (GB); Patrick Dantressangle, Eastleigh (GB); Christopher R. Gibson, Southampton (GB); David R. Vyvyan, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 12/952,803

(22) Filed: Nov. 23, 2010

(65) Prior Publication Data

US 2011/0131242 A1 Jun. 2, 2011

(30) Foreign Application Priority Data

Nov. 27, 2009 (EP) ..................................... 09177311

(51) Int. Cl.
*G06F 17/30* (2006.01)
(52) U.S. Cl. ......... 707/775; 707/627; 707/770; 707/773
(58) Field of Classification Search .................. 707/627, 707/628, 629, 630, 631, 632, 633, 705, 764, 707/770, 766, 767, 773, 774, 775, 999.002, 707/999.01
See application file for complete search history.

(56) References Cited

U.S. PATENT DOCUMENTS

| 7,111,019 B1 * | 9/2006 | Nishizawa et al. ................... 1/1 |
| 7,685,265 B1 * | 3/2010 | Nguyen et al. ................ 709/223 |
| 2009/0037391 A1 * | 2/2009 | Agrawal et al. ................... 707/3 |
| 2009/0077036 A1 | 3/2009 | Bent et al. |
| 2010/0125545 A1 * | 5/2010 | Navas ........................... 707/602 |

* cited by examiner

*Primary Examiner* — Greta Robinson
(74) *Attorney, Agent, or Firm* — Thomas E. Lees, LLC (57) ABSTRACT

Methods and systems are provided, for persistent querying in a federated database system. A federated database system has a plurality of connectable database management system nodes, each database node having at least one database. Persistent querying includes: receiving a query at a first database node and propagating the query from the first database node to other database nodes in the federated database system. A responding database node satisfying the query: obtains a query results set; defines a topic identifier for the query; and publishes subsequent messages relating to the topic identifier when data updates are available. The first database node receives query results sets from one or more responding nodes and the first database node subscribes to topic identifiers for publications of subsequent messages from the responding database nodes. Subsequent messages are published relating to the query along the connection through which the query is returned.

23 Claims, 9 Drawing Sheets

PERSISTENT QUERYING IN A FEDERATED DATABASE SYSTEM

CROSS-REFERENCE TO RELATED APPLICATIONS

This application claims priority to European Patent Application No. 09177311.9, filed Nov. 27, 2009, the disclosure of which is incorporated herein by reference.

BACKGROUND

Aspects of the present invention relate to the field of querying in federated databases, and in particular, to a persistent query mechanism in a federated database.

Smart push technologies, and smart pull technologies provide different paradigms for exchanging information across a network comprised of distributed information sources and users of the exchanged information. An example of a smart push technology is a message broker technology. An example of a smart pull technology is a Distributed Federated Database technology.

Traditional message broker technology uses a publish/subscribe paradigm for distributing information from publishers to subscribers. While such networks are asynchronous, a mechanism is still necessary for discovering which topics are being published. Moreover, traditional message broker technology requires routing to be set up between all publishers and subscribers in the network.

In contrast, federated databases use distributed database query mechanisms to discover distributed information sources that can respond to a query. Further, the federated databases can aggregate query-responsive information across the network to return a single consolidated result-set to the querying node. This synchronous mechanism finds the nodes that can contribute the required information and returns data to the requesting node by the current 'fastest path'. However, federated databases pay a penalty by using a constrained flood query to discover the sources of information called upon to return query results to a querying node.

BRIEF SUMMARY

Approaches are provided for persistent querying in a federated database system. A federated database system has a plurality of connectable database management system nodes, each database node having at least one database. Persistent querying within the federated database system comprises receiving a query at a first database node and propagating the query from the first database node to other database nodes in the federated database system. A responding database node satisfying the query obtains a query results set, defines a topic identifier for the query and publishes subsequent messages relating to the topic identifier when data updates are available. The first database node receives query results sets from one or more responding nodes and the first database node subscribes to topic identifiers for publications of subsequent messages from the responding database nodes. Subsequent messages are published relating to the query along the connection through which the query is returned.

BRIEF DESCRIPTION OF THE SEVERAL VIEWS OF THE DRAWINGS

Various aspects of the present invention may best be understood by reference to the following detailed description when read with the accompanying drawings in which.

DETAILED DESCRIPTION

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of aspects of the present invention. However, it will be understood by those skilled in the art that aspects of the present invention may be practiced without these specific details. In other instances, well-known methods, procedures, and components have not been described in detail so as not to obscure the disclosure herein.

Methods, computer program products and systems are described, in which a hybrid mechanism of push and pull architectures is provided. The hybrid mechanism enables a persistent query to obtain information from distributed sources. The hybrid mechanism also provides a fully distributed mechanism for topic discovery and dynamic topic generation. The hybrid mechanism may further provide for automatically discovering the optimum routes over which topics are published, and the hybrid mechanism may further provide for automatically adapting the optimum routes to changing network conditions and interconnectivity.

The described architectures herein, may be fully distributed and may not require any node to have any knowledge of existing topics other than knowledge of the database data schemas that exist in the network.

As such, certain aspects of the present invention facilitate the ability to obtain a persistent stream of results that correspond to the same query. As an example, a query may be performed to obtain information from a specific set of tables, distributed across a number of database nodes, which are being intermittently updated with new data. The querying node (or nodes) may wish to receive any future data as it is entered into these tables. Aspects of the present invention set out in greater detail herein, can obtain such updated data without requiring a conventional synchronous pull mechanism operation that performs more queries (i.e., polling for new data), which can be expensive, particularly if many polling queries are required to ensure that intermittent data updates are captured in a timely manner.

Figure 1A:
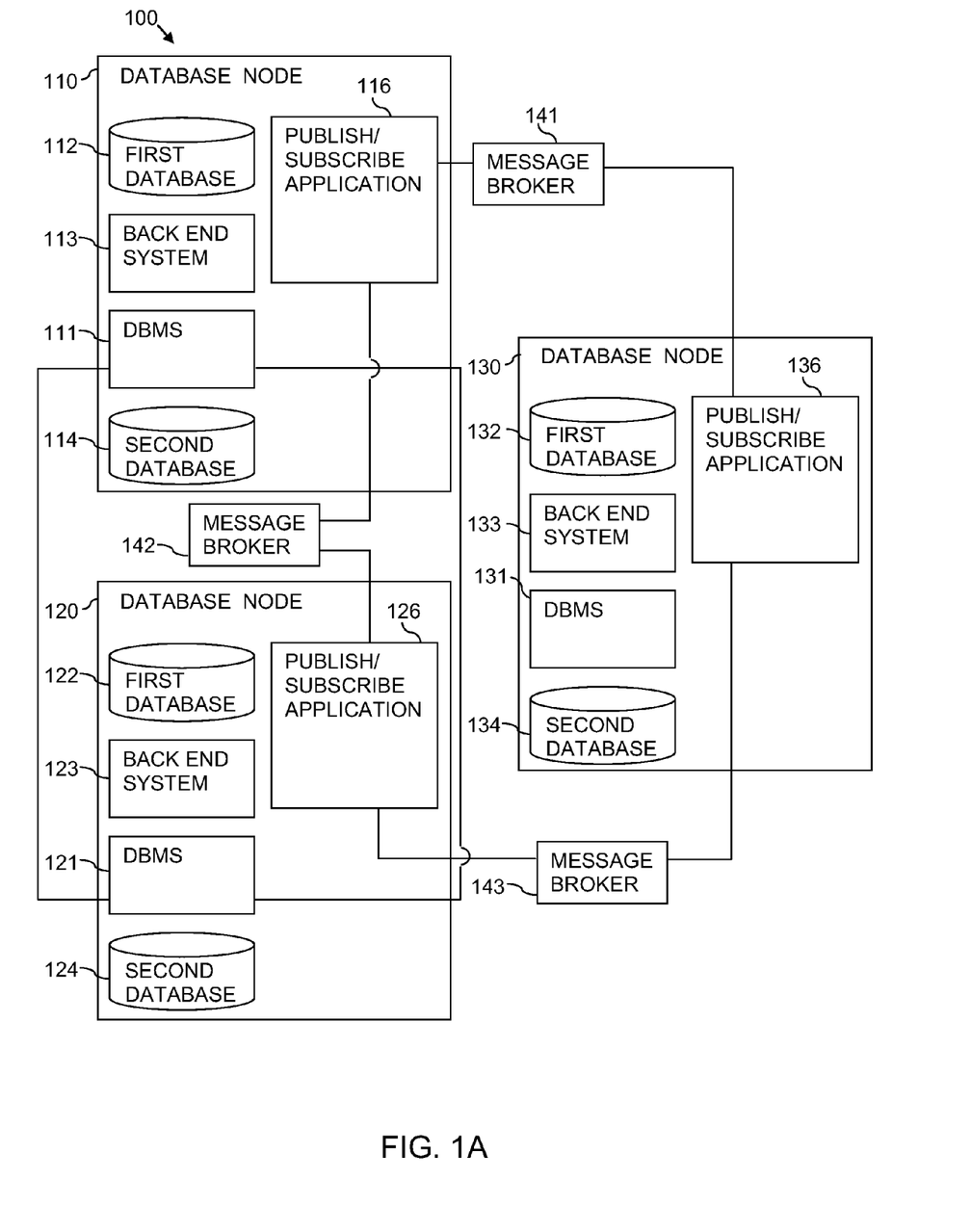
FIG. 1A is block diagram of a federated database system in accordance with aspects of the present invention.

Referring to FIG. 1A, a system 100 is shown in which a federated database is made up of database nodes 110, 120, 130. Each database node 110, 120, 130 is a distributed database typically formed of a database management system (DBMS) 111, 121, 131 operable to access, for example, a first database 112, 122, 132 associated with a back end computing system 113, 123, 133 and also operable to access a second database 114, 124, 134 that is local to the DBMS 111, 121, 131. The system 100 is simplified for illustrative purposes. In this regard, the database nodes 110, 120, 130 are referred to as distributed, as each DBMS 111, 121, 131 is operable to access multiple databases.

A distributed database federation is a virtualized database that allows constituent database nodes 110, 120, 130 to remain autonomous but provides a uniform front-end user interface, enabling users to store and retrieve data in multiple non-contiguous databases with a single query. The database management systems 111, 121, 131 of the database nodes in the federation are fully interconnected to each other. The database management systems 111, 121, 131 act as interpreters and intermediaries between the various databases and back-end computing systems. When a query is made within the federated database, one or more database management systems 111, 121, 131 decompose the query into sub-queries for submission to the relevant constituent database management systems 111, 121, 131.

In the described system 100, the database management systems 111, 121, 131 include publish/subscribe applications 116, 126, 136. Moreover, the system 100 provides a message broker network of publish/subscribe message brokers 141, 142, 143. These message brokers 141, 142, 143 can be shared between many database management systems 111, 121 131. In this regard, any configuration of database management systems 111, 121, 131 and message brokers 141, 142, 143 can be used. However, the configuration with one message broker 141, 142, 143 per database management system 111, 121, 131 is a generic case. The message brokers 141, 142, 143 may be provided in paths between the database management systems 111, 121, 131 of the database nodes 110, 120, 130.

Publish/subscribe is an asynchronous messaging paradigm where publishers of messages characterize a message by a "topic" or named logical channel, and publish the characterized message to a message broker. The message broker is an intermediary which registers subscriptions and performs filtering. The message broker may perform a store and forward function to route message from publishers to subscribers. Subscribers express interest in one or more topics, and only receive messages published on that topic.

In the described mechanism, each database node that can provide data in response to a query responds to the initial query with a result set that has a topic identifier uniquely generated by the node. For example, the topic identifier may be a hashing result of a node identifier and an original query identifier (node_id+original_query_id). Any future data that is entered into the database that satisfies the query is then published as a message into a message broker network to which the querying node can subscribe. As the result set of the initial query is returned to the querying node, brokers along the returning routes are instructed to subscribe to any messages on the new published topic and to publish any messages received along the route by which the initial query was returned.

Figure 1B:
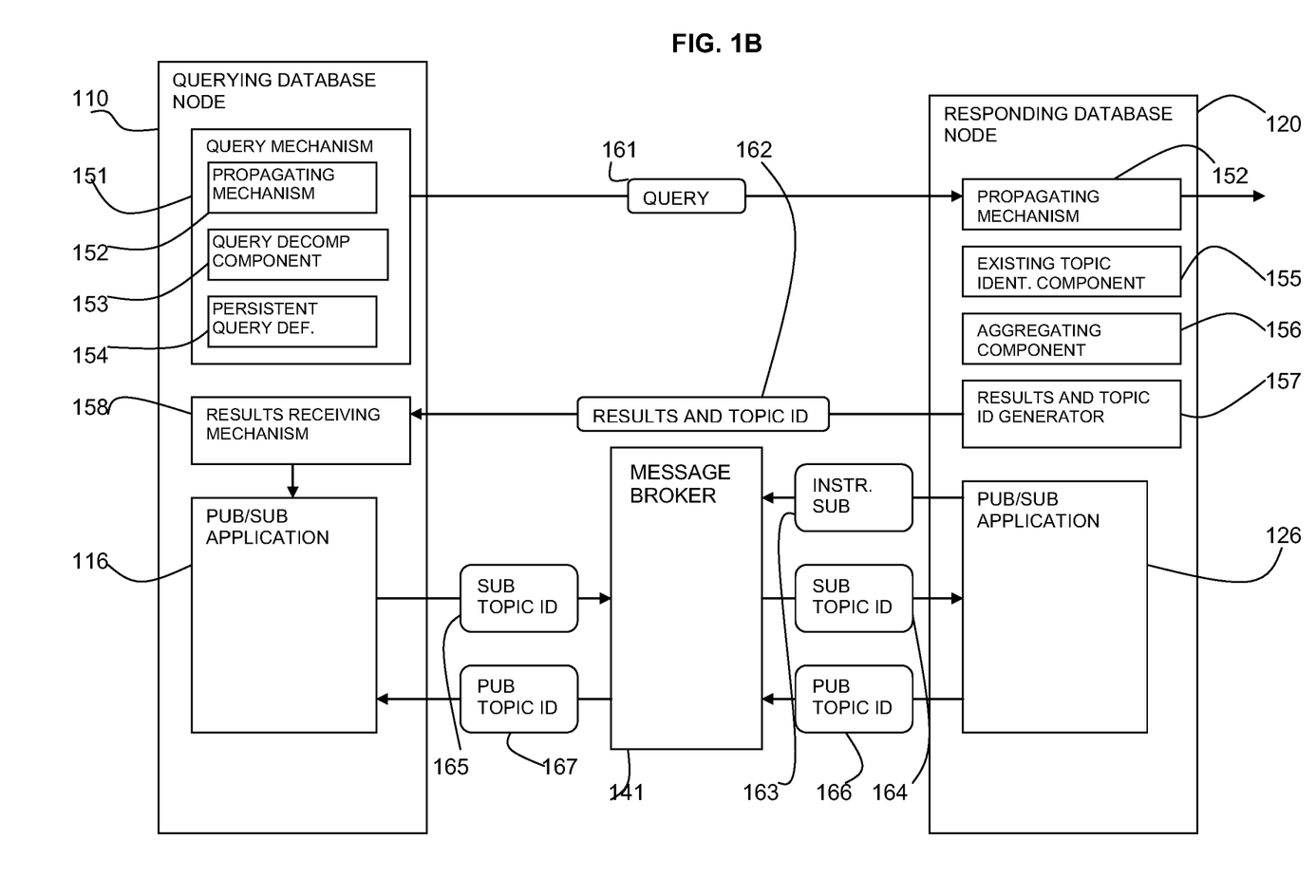
FIG. 1B is a detail of FIG. 1A showing data flow in accordance with aspects of the present invention.

Referring to FIG. 1B, a detail of the system of FIG. 1A is shown, with data flow between two database nodes 110, 120 and a message broker 141.

A querying database node 110 sends a query 161 from a query mechanism 151 to another database node 120. The query mechanism 151 includes a propagating mechanism 152 to propagate the query 161 to other database nodes. The query mechanism 151 also includes a persistent query definition 154 to inform the database nodes that publication of subsequent messages is required. The query mechanism 151 also includes an optional query decomposition component 153 for decomposing a query into sub-queries before propagation to other database nodes.

The responding database node 120 searches for the query 161 and may use a propagating mechanism 152 to extend the query to other database nodes. The responding database node 120 defines a topic identifier for the query using a results and topic identifier generator 157. The responding database node 120 further returns the results and the defined topic identifier 162 to the querying database node 110. The responding database node 120 may include an existing topic identifying component 155 for identifying existing topic identifiers that satisfy a query received from another node. The responding database node 120 may also include an aggregating component 156 for aggregating results from other database nodes before returning a result set to the querying database node 110.

The responding database node 120 has a publish/subscribe application 126, which instructs 163 a broker 141 to subscribe 164 to any messages on the topic identifier. The querying database node 110 has a result receiving mechanism 158 that activates a publish/subscribe mechanism 116 which in turn subscribes 165 to the broker 141 for any messages on the topic identifier. When a new message is published 166 by the responding database node 120 due to a database update on the topic, it is received by the broker 141 and published 167 to the querying database node 110.

Where the initial query can be satisfied at several nodes, each node generates its own topic identifier and responds in the way described above with routes back to the initial querying node being established. The querying node then subscribes to all of the topic identifiers to get the aggregated set of future data from all sources satisfying the query.

The same query, even when issued from the same querying node, can and often results in different 'optimum' return routes being established. If the same process is followed to enable multiple returning message paths, then the described method also provides a high degree of resilience to path disruption and message traffic. It may thus be desirable to issue the same initial query multiple times to establish these additional routes.

If the same or similar query is issued from other nodes in the network, and nodes that can respond to the query can identify that an existing topic satisfies the same query, then the response to the query will be an existing topic which is already being published. As the result set is returned to the querying node then, only brokers along the route that have not previously been enabled to publish and subscribe on the topic need be enabled. As an illustration, the mechanism for identifying that the query is the same can be based on a database caching mechanism.

Figure 2:
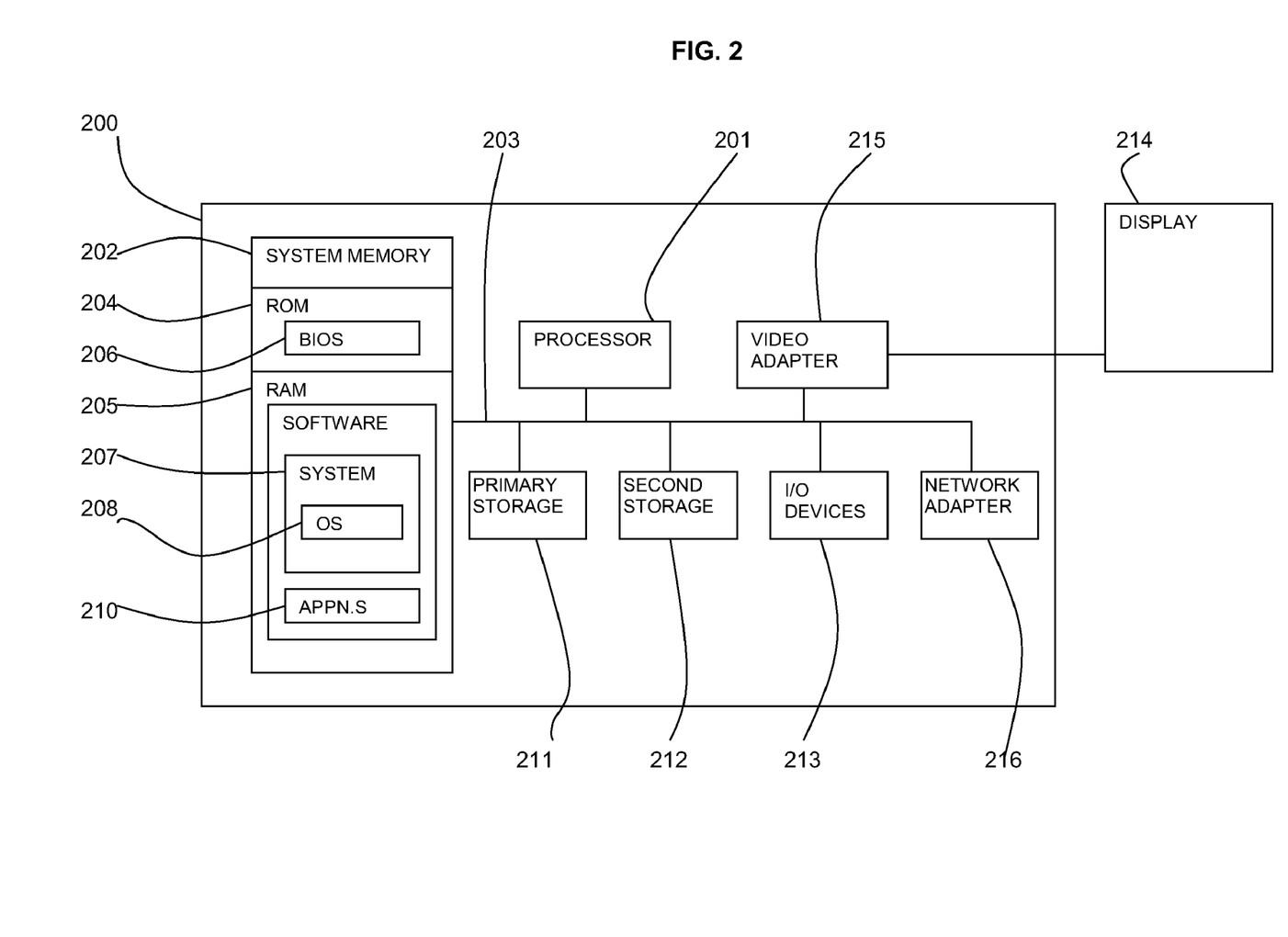
FIG. 2 is a block diagram of a computer system in which aspects of the present invention may be implemented.

Referring to FIG. 2, an exemplary system for implementing a database node according to aspects of the invention includes a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include primary storage 211 such as a magnetic hard disk drive and secondary storage 212 such as a magnetic disk drive and an optical disc drive. The drives and their associated computer-readable media provide non-volatile storage of computer-executable instructions, data structures, program modules and other data for the system 200. Software applications may be stored by the primary and secondary storage 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices, for example, microphone, joy stick, game pad, satellite dish, scanner, or the like. Output devices may include speakers, printers, etc. A display device 214 is also connected to system bus 203 via an interface, such as video adapter 215.

Figure 3:
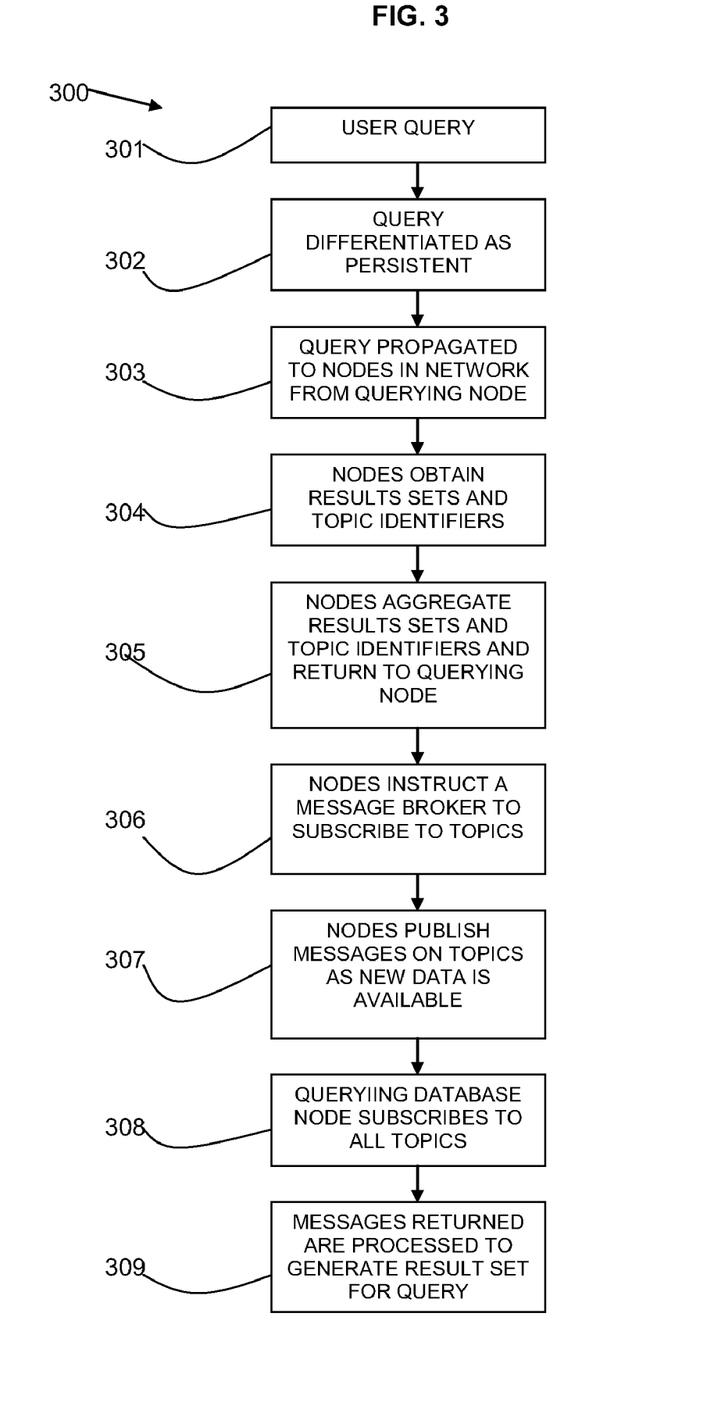
FIG. 3 is a flow diagram of a method in accordance with aspects of the present invention.

Referring to FIG. 3, a flow diagram 300 shows a method of propagating a persistent query in a federated database environment.

A user queries 301 any one of the database nodes of the Distributed Federated Database (DFD) network using a Structured Query Language (SQL) query that defines the required information. This query is differentiated 302 from a standard query that is just required to return a single result set. In an illustrative embodiment, this differentiation is achieved by adding the extension "AND PERSIST QUERY" to the SQL statement e.g., select TOPIC from TABLE and persist query.

The query propagates 303 to all nodes in the network from the querying node. Those nodes that can, obtain 304 data in response to the query return and generate a topic identifier. Responding database nodes aggregate 305 any results sets and topic identifiers from lower database nodes and return these to the querying database node.

The responding database nodes instruct 306 an associated message broker to subscribe to future messages on the topic identifiers satisfying the query. The responding database nodes publish 307 any future messages on the topic to the message broker.

The querying database receives the results of the query and subscribes 308 to messages in the set of topics returned in the result set. Messages returned are processed 309 to generate a result set that satisfies the initial query, for example, performing the union, distinct database operations.

Figure 4:
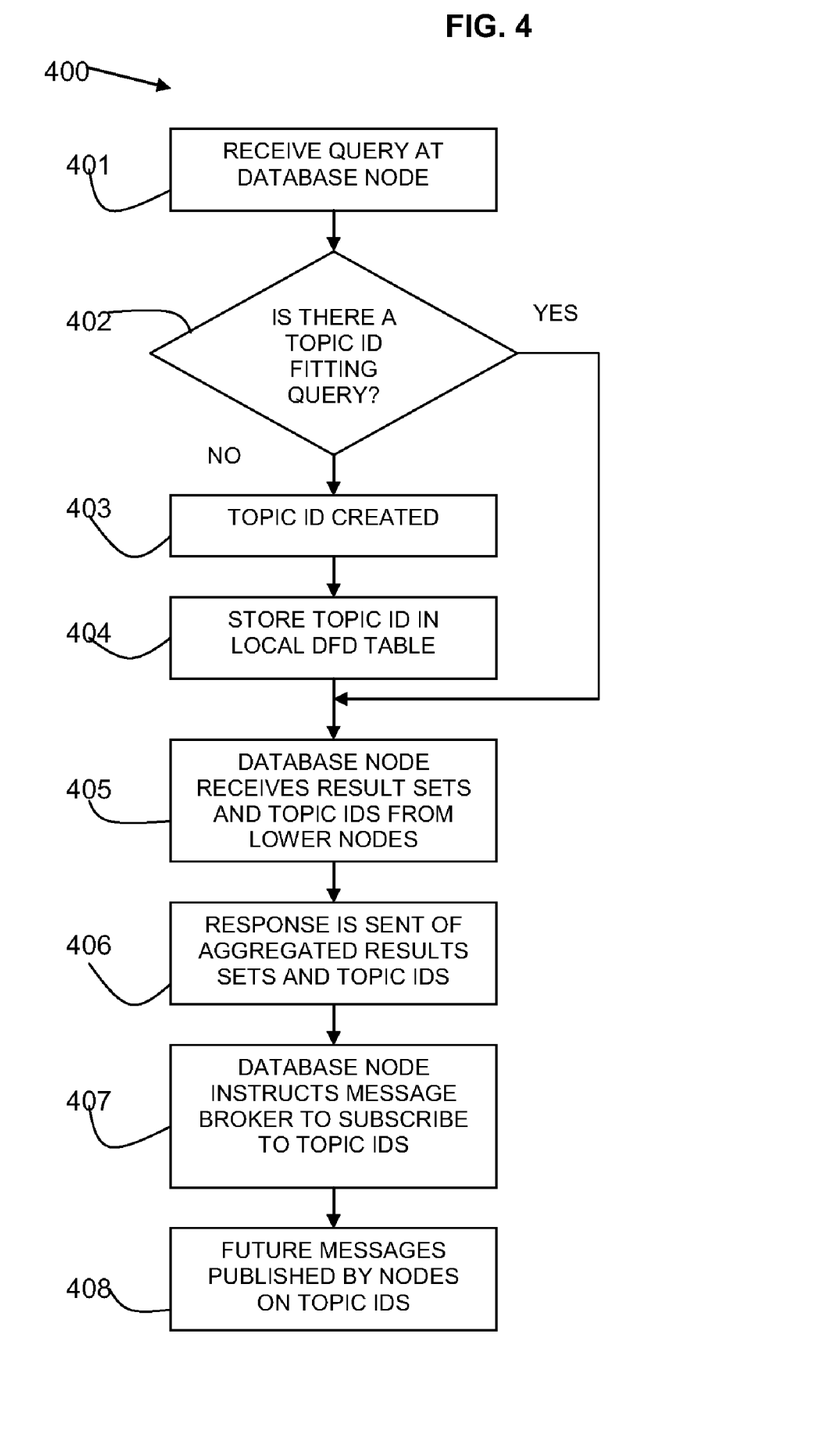
FIG. 4 is a flow diagram of a method at a database node in accordance with aspects of the present invention.

Referring to FIG. 4, a flow diagram 400 shows a method that can be implemented at a responding database node. A query is received 401. A determination is made 402 as to whether a topic identifier fitting the query exists. If a topic identifier does not already exist, a topic identifier is created 403 and the topic identifier is stored 404 in the local Distributed Federated Database table. This topic identifier is used to identify messages that match the query and that will be published by the local broker. Additional appropriate meta-data may also be stored with the topic identifier in the local Distributed Federated Database table to enable the topic to be discovered via this table and to assist the process of determining if the topic already exists. For example, the invariant components of the query might be stored. If a topic identifier exists steps 403 and 404 are skipped.

If the responding database node is an intermediary node with further responding database nodes below it in a hierarchy, the responding database node receives 405 results sets and topic identifiers from the other lower nodes. A response to the query is sent 406 in the form of an aggregation of the result sets and topic identifiers.

A message broker is instructed 407 to subscribe to future messages from the responding database node on the topic identifiers. Future messages are published 408 by the responding database node on the topic identifiers along the connection though which the query is being returned to enable the querying database node to subscribe to the topic identifiers and receive persistent responses to the query.

As the result set is aggregated at each intermediate node along the route back to the querying node, the associated broker is instructed to subscribe to messages on the returned topic and to publish these to the broker attached along the connection through which the query is being returned. If the associated node is already subscribing to the topic (because of a previous query), it may still be necessary to instruct the broker to publish the topic along the connection through which the query is being returned, if it is not already doing so.

Referring to FIGS. 5A to 5D, schematic diagrams show the process of querying in nodes of a federated database. A federated database is shown 500 with nodes 501-514 with each node being a database node with at least one database.

Figure 5A:
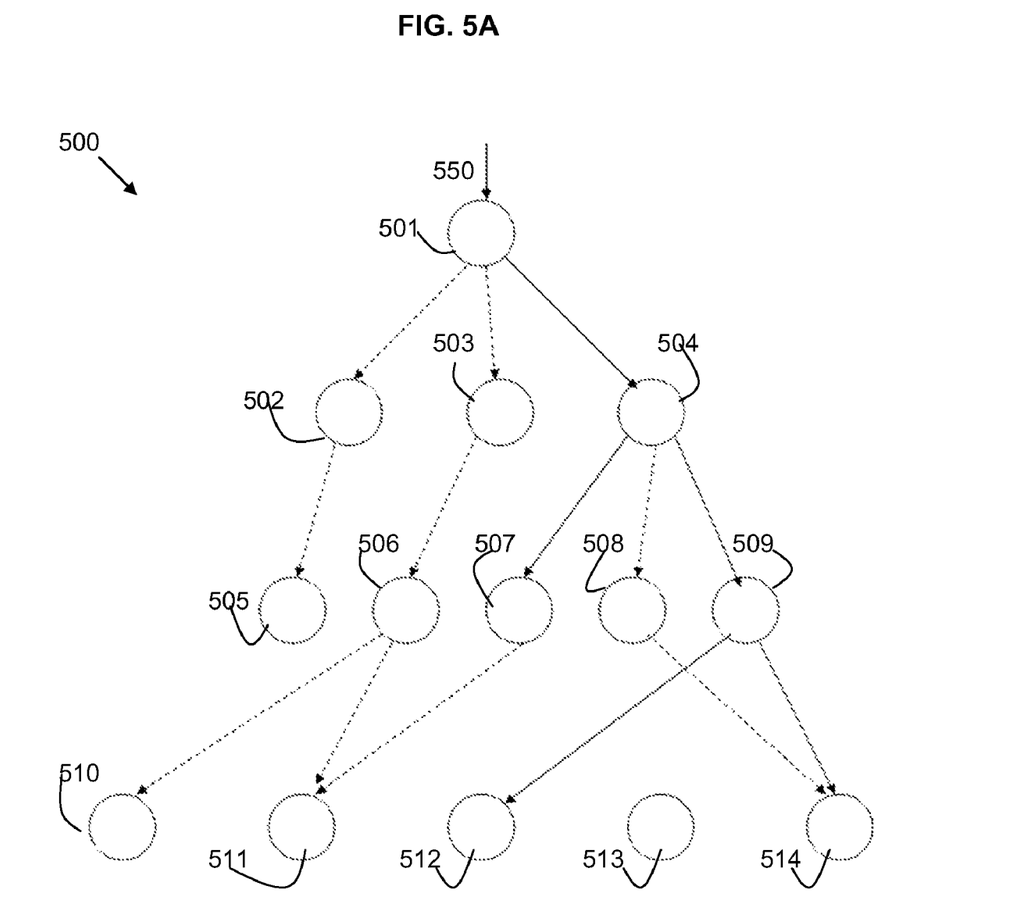
FIGS. 5A to 5D are schematic diagrams showing data flow between nodes in accordance with aspects of the present invention.

In FIG. 5A, a query 550 is propagated to all nodes. In this illustrative example, nodes 501, 504, 507, 509, 512 and 514 generate results and are shown in solid lines. Queries to nodes 502, 503, 505, 506, 508, 510 and 511 do not generate results, and are shown in dashed lines.

Figure 5B:
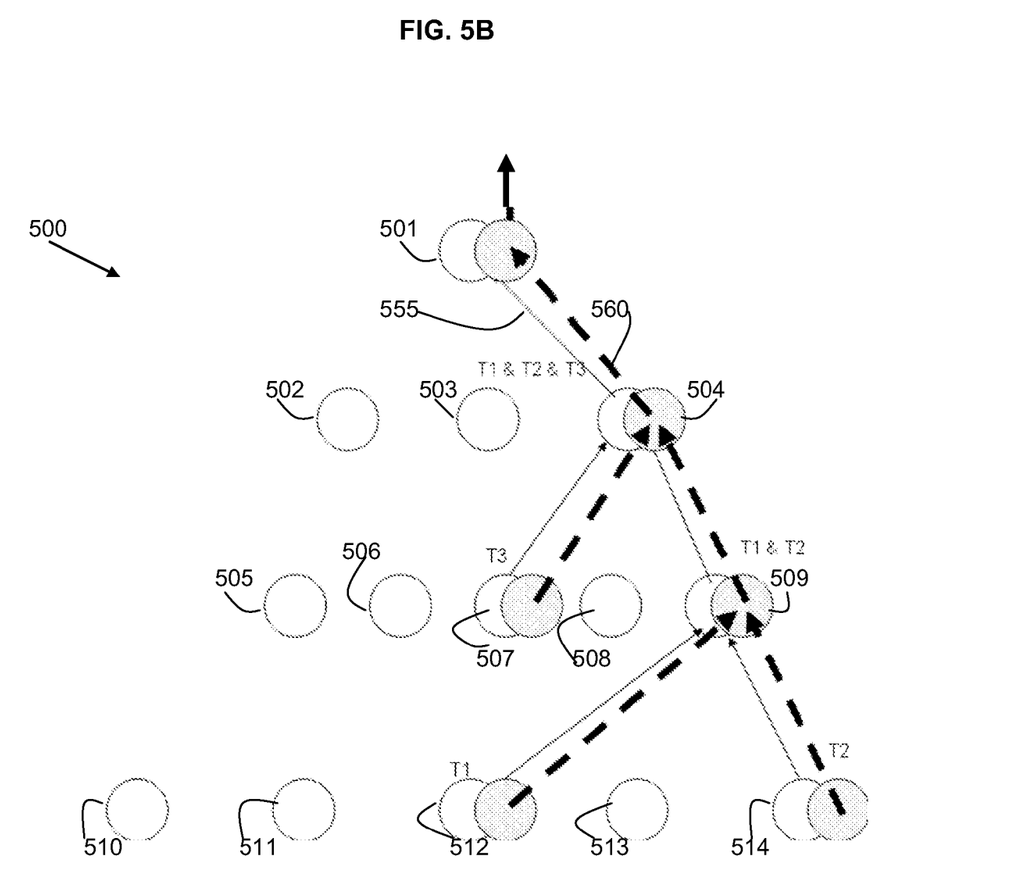

FIG. 5B shows a returned results set 555 with topic identifiers from the nodes. For example, node 512 returns topic identifier T1, node 514 returns topic identifier T2. Node 509 returns topic identifiers T1 and T2 and node 507 returns topic identifier T3. This results in node 504 returning topic identifiers T1, T2 and T3 to node 501. A message stream 560 for future messages on the topics is then established using publish/subscribe to subscribe to all topic identifiers T1, T2 and T3.

Figure 5C:
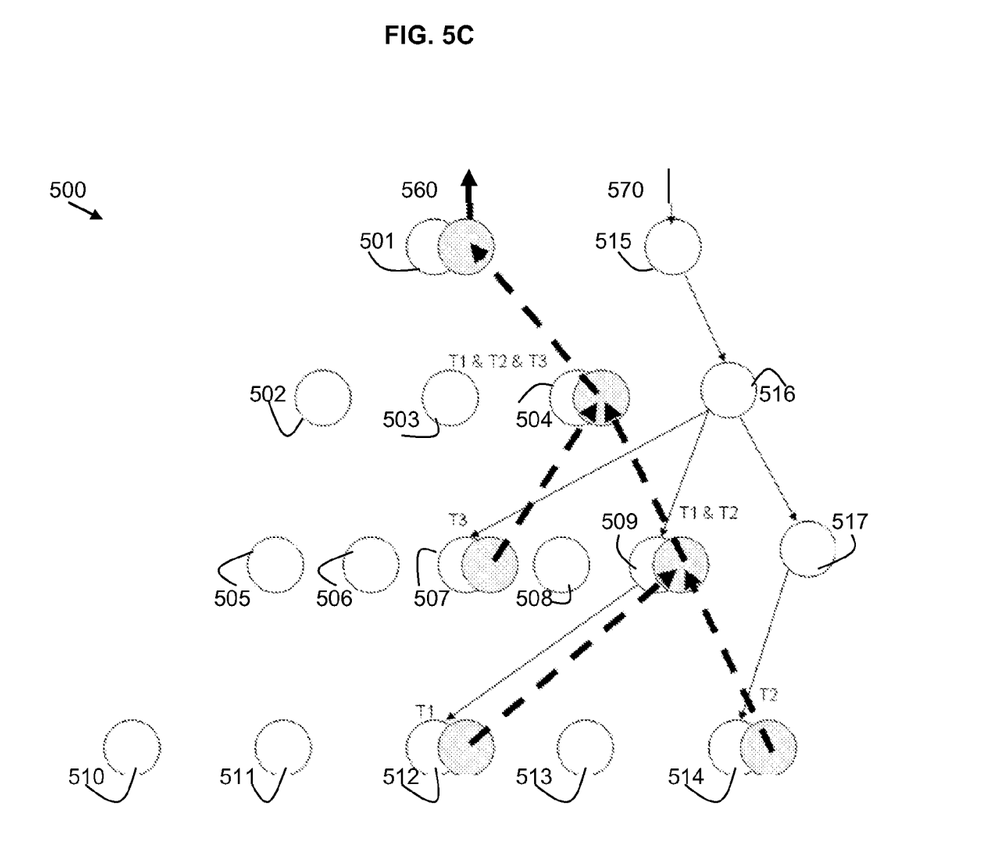

FIG. 5C shows a further query 570 being propagated to additional nodes 515, 516, 517 as well as existing nodes 507, 509, 512 and 514. Results are returned from all these nodes 507, 509, 512, 514, 515, 516, 517.

Figure 5D:
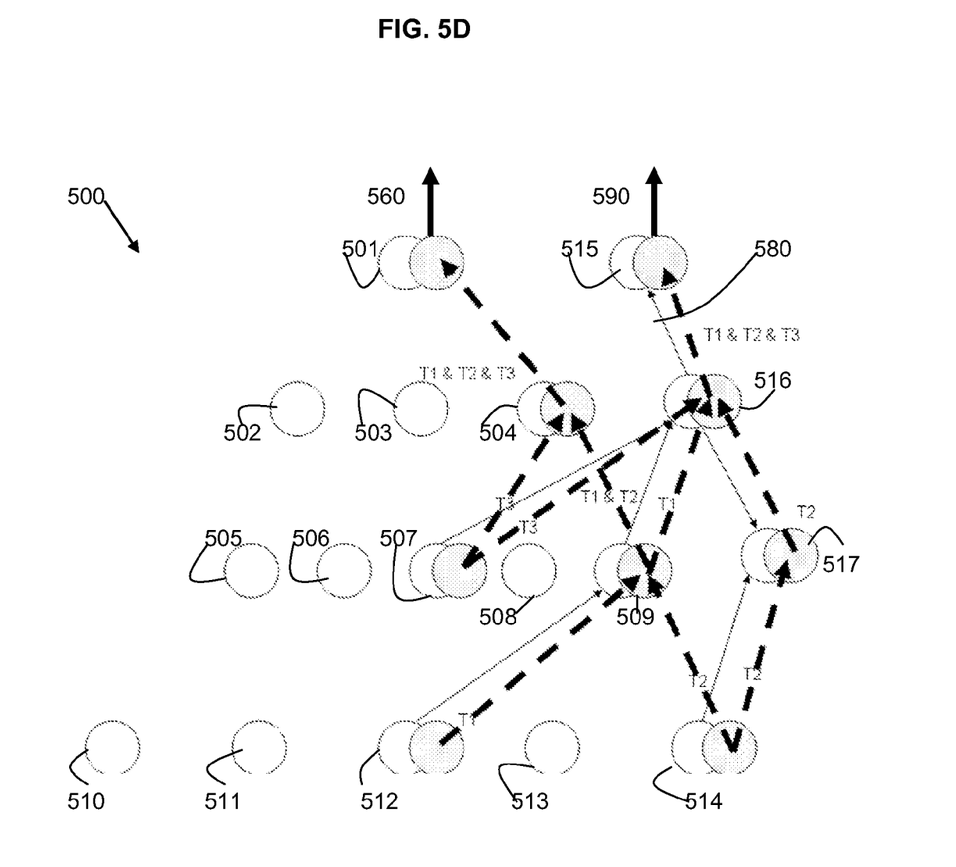

FIG. 5D shows a retuned results set 580 with topic identifiers from the nodes. Additional node 517 returns topic identifier T2 and node 516 returns topic identifiers T1, T2 and T3. An additional message stream 590 is established for future messages using publish/subscribe to all topic identifiers T1, T2 and T3.

The discovery of new sources of data that might appear in the network that could satisfy the initial query would be discovered by nodes periodically re-issuing the queries and adding any new topic identifiers to the list of topics that are subscribed to get the aggregated result set from the query.

The initial query could be constructed to return both existing data as part of the result set, together with the topic identifier for future data that satisfies the query. For example, select DATA, TOPIC from TABLE and persist query.

In an alternative embodiment of the disclosure, rather than enabling the message broker network as the query returns from the nodes satisfying the initial query, the return route is simply recorded and the resulting path/paths for each topic are reported to a 'topology manager' which uses all available information to determine an optimum set of routes. In cases where the route returned from the query may not be available because of policy requirements or other network issues, an alternative route may be planned using the information and the message broker network is then instructed to route messages over these alternative routes.

The systems, methods and computer program products described herein, show various hybrid push/pull architectures. In this regard, aspects described herein, provide for the dynamic creation of topics based on response to queries. Further aspects described herein, provide a distributed topic registry. Still further aspects herein provide for the dynamic creation of routes between publishers and subscribers. Still further aspects provide for the minimization of the number of routes as more subscribers are added to the network. Yet further aspects described herein provide an asynchronous persistent query mechanism.

As will be appreciated by one skilled in the art, aspects of the present invention may be embodied as a system, method or computer program product. Accordingly, aspects of the invention can take the form of an entirely hardware embodiment, an entirely software embodiment or an embodiment containing both hardware and software elements. Further, aspects of the invention can be implemented in software, which includes but is not limited to firmware, resident software, microcode, etc.

Aspects of the present invention can take the form of a computer program product accessible from a computer-usable or computer-readable storage medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD. In the context of this document, a computer readable storage medium may be any tangible storage medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Improvements and modifications can be made to the foregoing without departing from the scope of the present invention.

What is claimed is:

1. A method for persistent querying in a federated database system having a plurality of connectable database management system nodes, each database node having at least one database, the method comprising:
   receiving a query at a first database node;
   propagating the query from the first database node to other database nodes in the federated database system;
   receiving, by the first database node, query results sets from at least one responding node, wherein at least one responding node satisfying the query:
      obtains a query results set;
      defines a topic identifier for the query; and
      publishes subsequent messages relating to the topic identifier when data updates are available;
   subscribing, by the first database node, to topic identifiers for publications of subsequent messages from the responding database nodes; and
   optimizing a route from the responding node to the first database node by periodically re-issuing the query from the first database node to other database nodes in the federated database system and wherein the responding node further defines a new topic identifier associated with the re-issued query.

2. The method as claimed in claim 1, further comprising:
   publishing the subsequent messages relating to the query along the connection through which the query is returned.

3. The method as claimed in claim 1, wherein:
   receiving query results sets further comprises receiving, by the first database node, the query results sets from an intermediate responding node that aggregates query results sets and topic identifiers from lower responding database nodes in the propagation.

4. The method as claimed in claim 1, further comprising:
   decomposing the query into sub-queries before propagation to other database nodes;
   wherein a corresponding topic identifier relates to an associated sub-query.

5. The method as claimed in claim 1, further comprising:
   defining the query as a persistent query to inform the database nodes that publication of subsequent messages is required.

6. The method as claimed in claim 1, further comprising:
   instructing a message broker to subscribe to messages on its topic identifier and to publish subsequent message to other database nodes.

7. The method as claimed in claim 1, further comprising:
   enabling a network of message brokers on aggregated topic identifiers in a route of returned query results from database nodes.

8. The method as claimed in claim 7, further comprising:
   recording return routes of topic identifiers; and
   enabling message brokers on the optimum return routes.

9. The method as claimed in claim 1, further comprising:
   receiving by a select one responding database node, the same query from another node; and
   identifying existing topic identifiers that satisfy the query.

10. The method as claimed in claim 1, further comprising:
    storing topic identifiers locally on a database node for use with future queries.

11. The method as claimed in claim 10, further comprising:
    storing meta-data with topic identifiers to aid discoverability of a topic identifier for a query.

12. A computer-readable storage device with an executable program for persistent querying in a federated database system having a plurality of connectable database management system nodes, each database node having at least one database, wherein the program instructs a processor to perform:
    receiving a query at a first database node;
    propagating the query from the first database node to other database nodes in the federated database system;
    receiving, by the first database node, query results sets from at least one responding node, wherein at least one responding node satisfying the query:
       obtains a query results set;
       defines a topic identifier for the query; and
       publishes subsequent messages relating to the topic identifier when data updates are available;
    subscribing, by the first database node, to topic identifiers for publications of subsequent messages from the responding database nodes;
    optimizing a route from the responding node to the first database node by periodically re-issuing the query from the first database node to other database nodes in the federated database system and wherein the responding node further defines a new topic identifier associated with the re-issued query.

13. A system for persistent querying in a federated database system with a plurality of connectable database management system nodes, each database node having at least one database, comprising:
    a processor coupled to a memory such that the processor is programmed to implement:
       a query mechanism for receiving a query at a first database node;
       a propagating mechanism for propagating the query from the first database node to other database nodes in the federated database system;
       a responding database node including:
          a query results set obtaining component; and
          a topic identifier defining component for the query; and
       a publisher application for publishing subsequent messages relating to the topic identifier when data updates are available;
    wherein:
       the first database node includes a results receiving component for query results sets from one or more responding nodes;
       the first database node includes a subscriber application for subscribing to topic identifiers for publications of subsequent messages from the responding database nodes; and
       the first database node optimizes a route from the responding node to the first database node by periodically re-issuing the query from the first database node to other database nodes in the federated database system and wherein the responding node further defines a new topic identifier associated with the re-issued query.

14. The system as claimed in claim 13, wherein:
    an intermediate responding node includes an aggregating component to aggregate query results sets and topic identifiers from lower responding database nodes in the propagation.

15. The system as claimed in claim 13, wherein:
    the first database node includes a query decomposition component for decomposing a query into sub-queries before propagation to other database nodes and the topic identifier relates to the sub-query.

16. The system as claimed in claim 13, including a definition that the query is a persistent query to inform the database nodes that publication of subsequent messages is required.

17. The system as claimed in claim 13, wherein:
a database node instructs a message broker to subscribe to messages on its topic identifier and to publish subsequent message to other database nodes.

18. The system as claimed in claim 13, wherein:
a network of message brokers is enabled on the aggregated topic identifiers in a route of returned query results from database nodes.

19. The system as claimed in claim 13, including a route manager component wherein return routes of topic identifiers are recorded and message brokers enabled on the optimum return routes.

20. The system as claimed in claim 13, wherein:
a responding database node includes an existing topic identifier component for identifying existing topic identifiers that satisfy a query received from another node.

21. The system as claimed in claim 13, wherein:
a database node includes a table for storing topic identifiers locally for use with future queries.

22. The system as claimed in claim 21, wherein:
the table includes meta-data stored with topic identifiers to aid discoverability of a topic identifier for a query.

23. The method of claim 1, wherein the topic identifier and the new topic identifier are identical.

* * * * *